United States Patent
Kanellopoulos et al.

(10) Patent No.: US 6,777,461 B1
(45) Date of Patent: *Aug. 17, 2004

(54) POLYMERIC COMPOSITION FOR FRICTION ELEMENTS

(75) Inventors: Vasilios Kanellopoulos, Troinex (CH); Isabelle Louis-Joseph-Dogue, Annemasse (FR); Vincent Daniel McGinniss, Sunbury, OH (US); Duryodhan Mangaraj, Dubin, OH (US); Tomoki Tsuchiya Nakamura, Chiba (JP)

(73) Assignee: Nisshinbo Industries, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/601,912
(22) PCT Filed: Feb. 8, 1999
(86) PCT No.: PCT/IB99/00207
   § 371 (c)(1),
   (2), (4) Date: Dec. 1, 2000
(87) PCT Pub. No.: WO99/40146
   PCT Pub. Date: Aug. 12, 1999

(30) Foreign Application Priority Data

Feb. 9, 1998 (EP) .............................................. 98420024

(51) Int. Cl.⁷ .................................................. C08J 5/14
(52) U.S. Cl. ........................ 523/149; 523/150; 523/152; 523/155; 523/158

(58) Field of Search ................................. 523/149, 150, 523/152, 155, 158; 103/36

(56) References Cited

U.S. PATENT DOCUMENTS

| 3,911,045 | A |   | 10/1975 | Hartman et al. |
| 4,657,951 | A |   | 4/1987  | Takarada et al. |
| 5,132,349 | A | * | 7/1992  | Iimuro et al. ................ 324/265 |
| 5,736,619 | A | * | 4/1998  | Kane et al. .................. 525/393 |
| 5,889,081 | A | * | 3/1999  | Kakegawa et al. .......... 523/156 |

FOREIGN PATENT DOCUMENTS

| DE | 16 94 974     |   | 8/1971 |
| JP | 01-230661 A   | * | 9/1989 |
| WO | 96 33238      |   | 1/1996 |
| WO | 97 19977      |   | 6/1997 |

* cited by examiner

Primary Examiner—Katarzyna Wyrozebski
(74) Attorney, Agent, or Firm—Sturm & Fix LLP

(57) ABSTRACT

The polymeric composition for friction elements comprises a co-polymer between (I) a resin containing phenolic groups and a reticulation agent, and (II) an organopolysiloxane resin containing terminal silanol groups. A part at least of the phenolic groups is bound to the terminal silanol groups. A process of the preparation of the above polymeric composition may comprise the following steps: a) mixing (I) a resin containing the phenolic groups and the reticulation agent, (II) resin containing the terminal silanol groups, and (III) an epoxy resin or the epoxidisesd organopolysiloxane; b) curing the mixture for a period of time sufficient to complete substantially the reaction between the phenolic groups and the terminal silanol groups, c) post-heating the product obtained under b).

17 Claims, No Drawings

POLYMERIC COMPOSITION FOR FRICTION ELEMENTS

The invention is concerned with a polymeric composition for friction elements having remarkable properties with regard to temperature and contact with water. Although the invention will be described in more details with relation to brake pad or brake linings, it should be understood that it may be used in any application in which friction properties have to remain stable with increasing temperature and with water, such brakes and clutches for vehicles and machine tools. The brake pad is one example in which heat and water are of a prime importance due to a possible overheating if the braking action is applied for an extended period of time, during which moreover water may come In contact with the pads.

Preparations or compositions for friction elements for use in brake pads and other applications are known. One example a is mixture in which a phenolic resin and an organopolysiloxane or silicon resin are mixed with a crosslinking agent and described for instance in EP-0 456 490 and JP-63-251 452.

However, according to IR analysis, this mixture appears to be basically a simple mixture of the original phenolic resin and the product of the homoreaction between the silicon resin and itself. This means in particular that the reaction involved do not lead to specific interactions of the phenolic hydroxy groups with the silicon, most of the phenolic groups remaining as such, i.e are free phenolic groups. Hydrophilic properties are therefore retained together with a relatively high capacity of water absorption, which in turn is affecting strongly the friction characteristics of the product.

The object of the invention is therefore to make the reaction between a phenolic resin and an organopolysiloxane or silicon resin follow a different way, resulting in a actual co-reaction or condensation by co-polymerisation between the phenolic groups and the silanols groups of the silicon in SI—O—C and C—O—C bonds. A part at least of the free phenolic groups of the starting phenolic are consumed In such bonds and will not longer be available for water absorption. The reaction product will loose its hydrophilic properties and the water which may come in contact with said product will not be absorbed, yielding a composition with improved friction properties even under wet conditions.

Another object of the invention is to prepare a composition with superior heat resistance.

Another object of the invention is to prepare a composition with improved wet conditions performance.

In other words, the invention relates to a polymeric composition for friction elements, comprising a co-polymer between (I) a resin containing phenolic groups and a reticulation agent and (II) an organopolysiloxane resin or silicon containing terminal silanol groups, a part of the phenolic groups being bound to the terminal silanol groups.

Preferably, the resin containing phenolic groups is from 50 to 80% and the organopolysiloxane resin containing terminal silanol groups is from 8 to 25% by weight of the total starting mixture.

The starting resin comprising phenolic groups may also comprise terminal non aromatic alcoholic groups, a part at least of the terminal non aromatic alcoholic groups being also bound to the terminal silanol groups.

The reticulation agent may be an amine, such as an hexamine.

In one embodiment of the invention, the reticulation agent is an hexamine and is already present as a mix in a resin containing phenolic groups. Such a starting material is for instance that sold under the name of ®Xylox by Mitsui Toatsu Chemicals. In this commercial product, the resin containing phenolic groups is of the general formula (A) and may Include moieties of a general formula (A'), and contains hexamine (B) in a proportion between 8 and 12% by weight.

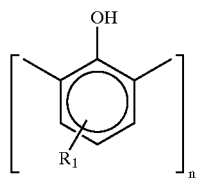

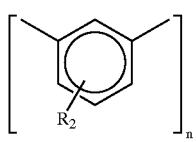

$R_1$ or $R_2$ = H, Alkyl, —CH$_2$OH

Other starting materials of the same sort may be used as well, such as ®Novalak type of resins The other compound, namely an organopolysiloxane resin containing terminal silanol groups may be an hydroxy phenyl alkyl silicone resin or methyphenylsiloxane for instance.

The invention relates as well to a process for the preparation of the polymeric composition, comprising the following steps:

a) mixing (I) a resin containing the phenolic groups and the reticulation agent, (II) a resin containing the terminal silanol groups, and (III) an epoxy resin or the epoxidised organopolysiloxane b) curing the mixture for a period of time sufficient to substantially complete the reaction between the phenolic groups and the terminal silanol groups, c) post-heating the product obtained under b).

It should be noted that the reaction is made in the presence of an epoxy resin or an epoxidised organopolysiloxane. This will push the reaction towards the way of a condensation or co-reaction leading to a copolymer rather than a simple homoreaction between the silicone resin and itself as mentioned above for the prior art.

Such a reaction involving the epoxy resin may be symbolised as follows:

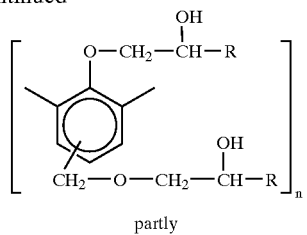

partly

The silicone resin is present in the starting mixture from 10 to 20% by weight, preferably around 20%. The epoxy resin may be for instance of ®Ciba-Geigy (GT 7071) type and may be present in the starting mixture from 20 to 40% by weight. The epoxidised organopolysiloxane may be for instance a polydialkylsiloxane and may be present in the starting mixture from 3 to 10%, but preferably around 5%

To make easier the blending of the starting resins, said resins are preferably in a form of powder with a particle size distribution of not more than 400 μm preferably below 300 μm for a compound such as ®Xylok cited above, and 200 μm for silicone.

The mixing step a) which may be held as well as a step for forming or shaping the end product is preferably conducted in a mould at a temperature not exceeding 50° C.

In general, the curing step b) is conducted under a pressure of at least 50 atm and a temperature from 80 to 160° C. and may be divided in a number of cycles permitting the degassing of the reaction mixture. In this case each degassing cycle is most preferably performed in sequence at increasing pressures and temperatures.

As to the post-heating step c) the temperature is advantageously of at least 200° C., under atmospheric pressure.

The various objects and advantages of the invention will become apparent with regard to the following non limitative examples.

EXAMPLES 1 TO 7

From a starting blend containing 20% epoxy resin GT 7071, 10% silicone resin 6-2230 and 70% ®Xylok, samples of 10×60 mm (table 1) were fabricated following the conditions described below.

Step 0: At least 60 s at the curing temperatures without pressure
Step 1: 5 degassing cycles with a pressure of 146 atm (6 s on, 10 s off) at the curing temperatures for 5, 12, 17.5, 23, or 30 minutes respectively at the curing temperature with a pressure of 183 atm.
Step 2: 10 minutes at 160° C. with 3 degassing cycles (6 s on, 10 s off)

TABLE 1

| Example | Curing temperature (° C.) | Time (min) |
|---|---|---|
| 1 | 80 | 23 |
| 2 | 80 | 12 |
| 3 | 150 | 23 |
| 4 | 150 | 12 |
| 5 | 115 | 5 |

TABLE 1-continued

| Example | Curing temperature (° C.) | Time (min) |
|---|---|---|
| 6 | 115 | 30 |
| 7 | 115 | 17.5 |

Specimens of theses formulations were submitted to different post-curing temperatures of 200° C. and 240° C. and processed with a brake pad with the usual additional ingredients, to form specific formulations for water tests.

The water absorption was tested using a method, where a 10 μl water drop is deposited at the surface of the sample and the time for absorption is recorded (table 2). On a ®Teflon surface, which was used as a reference, a 10 μl drop was evaporated in 60 minutes.

TABLE 2

| Examples | Curing Temperature (° C.) | Post-curing at 200° C. | Post-curing at 240° C. |
|---|---|---|---|
| 2 | 80 | 55 min | 61 min |
| 3 | 115 | 62 min | 74 min |
| 6 | 150 | 63 min | 67 min |

The results showed that the time needed for the water to disappear corresponds to almost that for its evaporation, which confirms that the water absorption for these resin formulations is very low.

After a heat treatment to 350° C., which was intended to simulate heating and over heating by breaking, the following comparative results were obtained for formulations post-cured at 240° C.

With specific formulations (resin and other conventional brake pad ingredients) prepared for water tests, the time needed for water to disappear (absorber or evaporated) for pure ®Xylox correspond to 12 s and to 10 s after heating at 350° C. for 1 h and 2 h respectively. The corresponding times for the specific formulations according to the invention, were at 407 s after 1 h heating at 350° C. and 186 s after 2 h heating at 350° C.

Several reactions could be expected between the different compounds of the formulations:

the OH end groups of the Xylok could react with the epoxy groups of GT 7071 resin allowing the formation of a C—$OH_2$—CHOH— bond, the OH end groups of the Xylok could react with those of the polydimethyl siloxane 6-2230 leading to the formation of a SC—O bond.

Infra-red evidence of the formation of those groups should be the reduction of the phenyl-$CH_2$—OH characteristic band near 1010 $cm^{-1}$ as well as the appearance of the typical bands of Si—C—O bond near 1100 c–1 (asymmetric stretching vibrations) and C—O—$CH_2$ bond near 1040 cm–1.

The time and temperature of exposure before curing (step 1) are important to the extent of reaction between silicone-hydroxyl and ®Xylok-hydroxyl groups. Hence, the change in the peaks were studied as a function of pro-curing temperature and time. Table 3 (reference bands with regards to starting resins) and Table 4 below summarise the characteristic bands for each IR spectrum.

TABLE 3

| Bands/Sample | Epoxy groups 835 cm$^{-1}$ | Si—O—C 850 cm$^{-1}$ | Si—OH 900 cm$^{-1}$ | Φ CH$_2$OH 1010 cm$^{-1}$ | Si—O—C or C—O—C— 1100 cm$^{-1}$ | —C=O 1650 cm$^{-1}$ | —CH— 3000 cm$^{-1}$ | —OH 3100-3600 |
|---|---|---|---|---|---|---|---|---|
| ®Xylok | none | none | none | strong | weak | none | strong | strong |
| Silicon resin | none | none | strong | none | strong | none | weak | weak |
| Epoxy resin | strong | none | none | none | weak | none | strong | weak |

Table 4 relates to formulations where step 0 was conducted at 80° C., with comparison to samples where step 0 was conducted of 12 min at 80° C., respectively with no curing or post-curing (3rd column in table).

TABLE 4

| Conditions | | | Epoxy groups | Si—O—C | Si—OH | Φ CH2OH | Si—O—C or C—O—C | —C=O | —CH— | —OH 3100- |
|---|---|---|---|---|---|---|---|---|---|---|
| Reaction time | Curing | Post-curing | 835 cm-1 | 850 cm-1 | 900 cm-1 | 1010 cm-1 | 1100 cm-1 | 1650 cm-1 | 3000 cm-1 | 3600 cm-1 |
| 12 min | no | no | strong | none | weak | strong | strong | none | strong | strong |
| 12 min | no | no | stronger | none | weak | smaller | strong | none | stronger | stronger |
| 12 min | 165° C. | no | stronger | none | smaller | smaller | stronger | none | strong | lower |
| 12 min | 165° C. | 240° C. | stronger | none | smaller | smaller | stronger | strong | strong | strong |
| 23 min | 165° C. | 240° C. | stronger | none | smaller | smaller | stronger | stronger | strong | strong |

EXAMPLES 8 TO 14

From a starting blend containing 5% of epoxidised solution of Dow Corning sold under the name of Additive 23, 20% silicone resin 6-2230 and 75% ®Xylok, 10×60 mm samples (table 1) were fabricated following the conditions described below.

Step 0: At least 1.5 min at the curing temperatures without pressure

Step 1: 5 degassing cycles with a pressure of 148 atm (6 s on, 10 s off) at the curing temperatures. 12, 17.5 or 30 minutes at the curing temperature with a pressure of 183 atm.

Step 2: 10 minutes at 160° C. with 3 degassing cycles (6 s on, 10 s off)

TABLE 5

| Example | Curing temperature (° C.) | Time (min) |
|---|---|---|
| 8 | 140 | 23 |
| 9 | 140 | 12 |
| 10 | 160 | 23 |
| 11 | 160 | 12 |
| 12 | 150 | 5 |
| 13 | 150 | 30 |
| 14 | 150 | 17.5 |

Specimens of these formulations were submitted to different posturing temperatures of 200° C. and 240° C. and processed with a brake pad with the usual additional ingredients, to form specific formulations for water tests.

The water absorption was again tested as for the formulations of the previous examples 1 to 7 using the above method of water droplet. As a result, the formulations as presented below, showed similar behaviour to that of the previous examples.

TABLE 6

| Examples | Curing Temperature (0° C.) | Reaction time (min) | Post-curing at 200° C. | Post-curing at 240° C. |
|---|---|---|---|---|
| 9 | 140 | 12 | 70 min | 72 min |
| 10 | 150 | 17.5 | 80 min | 77 min |
| 14 | 160 | 23 | 77 min | 66 min |

The results showed that the time needed for the water to disappear corresponds to almost that for its evaporation, which confirms that the water absorption for these resin formulations is very low.

After a heat treatment to 350° C., which was intended to simulate heating and over heating by breaking, the following comparative results were obtained for formulations postured at 240° C.

With specific formulations (resin and other conventional brake pad ingredients) prepared for water tests, the time needed for water to disappear (absorbed or evaporated) for pure ®Xylox correspond to 12 s and to 10 s after heating at 350° C. for 1 h and 2 h respectively. The corresponding times for the specific formulations according to the invention, were 1'972 s after 1 h heating at 350° C. and 1'832 s after 2 h heating at 350° C.

Also, if time needed for the water to disappear (absorbed or evaporated) correspond to 100% for the respective above inventive formulations as crude samples (no treatment to 350° C.), then after 1 h of heating to 350° C. these specific formulations for water tests were at 75%, 98% and 98% respectively for pure ®Xylox, Mitsui product ®Xylox plus. Si) and the inventive formulations.

However, after 2 h of heating at 350° C., the results were 63%, 53% and 87% respectively for pure ®Xylox, Mitsui product (®Xylox plus Si) and the inventive formulations.

These results indicate the excellent performance and good resistance of the inventive resin formulations to prolonged heat treatments as compared to pure ®Xylox or even the Mitsui product (®Xylox plus Si).

What is claimed is:

1. A polymeric composition for friction elements which consists essentially of a co-polymer between (I) a resin containing phenolic groups and a reticulation agent (II) an organopolysiloxane resin containing terminal silanol group, and (III) an epoxy resin or an epoxidised organopolysiloxane, wherein the bonding between the phenolic groups and the terminal silanol groups is substantially complete.

2. A polymeric composition according to claim 1, wherein the resin comprising phenolic group comprises also terminal non aromatic alcoholic groups, at least a part of the terminal non aromatic alcoholic groups being bound to the terminal silanol groups.

3. A polymeric composition according to any one of the preceding claims, in which the resin (I) containing phenolic groups is of general formula (A) and includes moieties of the general formula (A'):

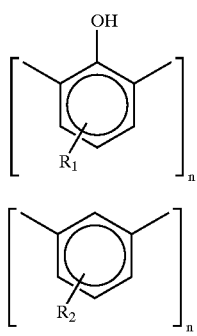

$R_1$ or $R_2$ = H, Alkyl, ——$CH_2OH$

4. The polymeric composition according to claim 1, wherein the organopolysiloxane resin (II) containing terminal silanol groups is a hydroxy phenyl alkyl silicone resin.

5. A polymeric composition according to claim 1, in which the reticulation agent is hexamine of formula:

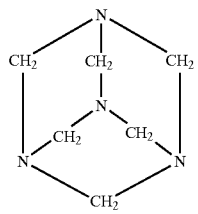

6. A process of preparation of a polymeric composition according to claim 1, comprising the following steps:

a) mixing (I) a resin containing the phenolic groups and the reticulation agent, (II) resin containing the terminal silanol groups, and (III) an epoxy resin or the epoxidised organosiloxane, b) curing the mixture for a period of time sufficient to complete substantially the reaction between the phenolic groups and the terminal silanol groups, c) post-heating the product obtained under b).

7. A process according to claim 6, in which the mixing step a) is conducted at a temperature not exceeding 50° C.

8. A process according to claim 7, in which the curing step b) is conducted under a pressure of at least 50 atm. and the temperature is from 80 to 160° C.

9. A process according to claim 6, in which the curing step b) is divided in a number of cycles permitting the degassing of the reaction mixture.

10. A process according to claim 9, in which each degassing cycle is conducted in sequence at increasing pressure and temperature.

11. A process according to claim 6, in which the post-heating step c) is conducted at a temperature of at least 200° C. under atmospheric pressure.

12. A process according to claim 6 in which the starting resins are in a form of powder with a particle size distribution of not more than 400 μm.

13. A method of constructing brake pads comprising the step of utilizing the polymeric composition according to claim 1 as a substrate.

14. The polymeric composition according to claim 2, wherein the organopolysiloxane resin (II) containing terminal silanol groups is a hydroxy phenyl alkyl silicone resin.

15. The polymeric composition according to claim 3, wherein the organopolysiloxane resin (II) containing terminal silanol groups is a hydroxy phenyl alkyl silicone resin.

16. A method of constructing brake pads comprising the step of utilizing the polymeric composition according to claim 2 as a substrate.

17. A method of constructing brake pads comprising the step of utilizing the polymeric composition according to claim 3 as a substrate.

* * * * *